US008718277B2

(12) United States Patent
Stek et al.

(10) Patent No.: US 8,718,277 B2
(45) Date of Patent: May 6, 2014

(54) INFORMATION CARRIER COMPRISING ACCESS INFORMATION

(75) Inventors: Aalbert Stek, Eindhoven (NL); Martinus Wilhelmus Blum, Eindhoven (NL); Bart Van Rompaey, Eindhoven (NL); Jacobus Petrus Josephus Heemskerk, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1133 days.

(21) Appl. No.: 10/545,640

(22) PCT Filed: Feb. 5, 2004

(86) PCT No.: PCT/IB2004/050079
§ 371 (c)(1),
(2), (4) Date: Aug. 16, 2005

(87) PCT Pub. No.: WO2004/075187
PCT Pub. Date: Sep. 2, 2004

(65) Prior Publication Data
US 2006/0190741 A1 Aug. 24, 2006

(30) Foreign Application Priority Data
Feb. 20, 2003 (NL) .................................... 1022743

(51) Int. Cl.
*H04K 1/10* (2006.01)
(52) U.S. Cl.
USPC .................. 380/32; 380/31; 380/200; 726/27
(58) Field of Classification Search
USPC .............................. 713/193, 182; 726/26–30; 380/200–202, 31, 32; 369/13.05, 369/13.07, 13.42, 275.3
See application file for complete search history.

(56) References Cited

U.S. PATENT DOCUMENTS 5,016,001 A 5/1991 Minagawa et al.
5,640,383 A * 6/1997 Kamoto et al. ............ 369/275.3
(Continued)

FOREIGN PATENT DOCUMENTS

EP 0802535 A1 10/1997
EP 0802535 B1 10/1997
(Continued)

OTHER PUBLICATIONS

Kesden G: Content Scrambling System (CSS), Introduction, Retrieve from Internet, www.-2.cs.cmu.edu/dst/DeCSS/kesd, Dec. 2000, XP002258975.
(Continued)

*Primary Examiner* — Nirav B Patel (57) ABSTRACT

An information carrier for holding user information, the information carrier comprising access information in the form of access information bits for accessing the user information, the access information bits being stored on the information carrier in a variation of a parameter, which variation is detectable by integration detection. The access information bits are scrambled according to a pre-determined scrambling method. By scrambling the access information bits according to a pre-determined scrambling method, detection of the access information is not possible as long as the scrambling method is not known. Using the integration detection technique, the only way to obtain the access information is by knowing how the signal obtained after reading-out the area comprising the access information bits must be processed. In this way illegal retrieval of the user information is further prevented.

20 Claims, 7 Drawing Sheets (56) References Cited

U.S. PATENT DOCUMENTS

| | | | |
|---|---|---|---|
| 5,682,365 A * | 10/1997 | Carasso et al. | 369/47.5 |
| 5,724,327 A | 3/1998 | Timmermans et al. | |
| 5,796,824 A * | 8/1998 | Hasebe et al. | 705/51 |
| 5,850,379 A * | 12/1998 | Moriya et al. | 369/59.26 |
| 5,850,403 A * | 12/1998 | Lasne | 714/755 |
| 5,886,979 A * | 3/1999 | Moribe et al. | 369/47.12 |
| 6,031,815 A * | 2/2000 | Heemskerk | 369/275.3 |
| 6,052,465 A * | 4/2000 | Gotoh et al. | 369/53.21 |
| 6,353,890 B1 * | 3/2002 | Newman | 713/193 |
| 6,373,815 B1 * | 4/2002 | Ishida et al. | 369/275.3 |
| 6,587,948 B1 * | 7/2003 | Inazawa et al. | 713/193 |
| 6,791,930 B2 * | 9/2004 | Ishida et al. | 369/59.25 |
| 6,938,162 B1 * | 8/2005 | Nagai et al. | 713/189 |
| 7,092,341 B2 * | 8/2006 | Kuribayashi et al. | 369/59.24 |
| 7,209,562 B2 | 4/2007 | Bernsen | |
| 7,301,889 B2 * | 11/2007 | Aoki | 369/275.3 |
| 7,596,075 B2 | 9/2009 | Kobayashi et al. | |
| 7,925,137 B2 * | 4/2011 | Chasen | 386/235 |
| 8,261,056 B2 * | 9/2012 | Tagawa et al. | 713/150 |
| 2001/0008016 A1 * | 7/2001 | Kotani et al. | 713/193 |
| 2001/0019612 A1 | 9/2001 | Kitani et al. | |
| 2002/0041686 A1 | 4/2002 | Moriyama et al. | |
| 2002/0136428 A1 | 9/2002 | Sugahara et al. | |
| 2003/0206511 A1 | 11/2003 | Kobayashi et al. | |
| 2004/0196759 A1 * | 10/2004 | Ishibashi et al. | 369/47.19 |

FOREIGN PATENT DOCUMENTS

| | | | | |
|---|---|---|---|---|
| EP | 1081698 A | | 3/2001 | |
| EP | 1154426 A2 | | 11/2001 | |
| EP | 1431973 | * | 9/2002 | G11B 20/10 |
| EP | 1475788 A1 | | 11/2004 | |
| EP | 1577885 A2 | | 9/2005 | |
| JP | 1055615 A | | 3/1989 | |
| JP | 1196675 A | | 8/1989 | |
| JP | 2000195049 A | | 7/2000 | |
| JP | 2001128171 A | | 5/2001 | |
| JP | 2001209937 A | | 8/2001 | |
| JP | 200125198 A | | 9/2001 | |
| JP | 2001320363 A | | 11/2001 | |
| JP | 2002057991 A | | 2/2002 | |
| JP | 2002093058 A | | 3/2002 | |
| JP | 2002108711 A | | 4/2002 | |
| JP | 2002109829 A | | 4/2002 | |
| JP | 2002109835 A | | 4/2002 | |
| JP | 2002203369 A | | 7/2002 | |
| JP | 2002238028 A | | 8/2002 | |
| JP | 2002298513 A | | 10/2002 | |
| JP | 2002300364 A | | 10/2002 | |
| JP | 2002536773 T | | 10/2002 | |
| JP | 2004505403 T | | 2/2004 | |
| JP | 2004213781 A | | 7/2004 | |
| JP | 2004531957 T | | 10/2004 | |
| WO | 9627191 A | | 9/1996 | |
| WO | 0045381 A1 | | 8/2000 | |
| WO | 0211136 A1 | | 2/2002 | |
| WO | 0225645 A1 | | 3/2002 | |
| WO | 02091377 A1 | | 11/2002 | |

OTHER PUBLICATIONS

Vlerken Van J J. L. M, et al: Format Detection for DVD+ReWritable 4.7 GB, IEEE Jun. 2000, pp. 162-163, XP002197293.

ISR for Publication, International Publication No. WO2004/075187(A1), Aug. 2004.

"Blu-Ray Rom CMF", Philips Digital Systems Laboratories, XP-002280468, 2003, p. 1-4.

"Lecture 33", Content Scrambling System (CSS), December 6, 2000, p. 1-11.

Core et al, "BER for Optical Heterodyne DPSK Receivers Using Delay Demoudlation and Integration Detection", IEEE Transactions on Communications, vol. 50, No. 1, Jan. 2002, p. 21-30.

Jan W.M. Bergmans, "Digital Baseband Transmission and Recording", Kluwer Academic Publishers, 1996, p. 122-129.

Stephen G. Wilson, "Digital Modulation and Coding", 1996, pp. 247-256.

* cited by examiner

FIG.6

INFORMATION CARRIER COMPRISING ACCESS INFORMATION

This application is a National Stage of International Application No. PCT/IB04/50079, filed Feb. 4, 2004, which claims the benefit of the Netherlands (NL) Patent Application No. 1022743, filed Feb. 20, 2003.

The invention relates to an information carrier for holding user information, the information carrier comprising access information in the form of access information bits for accessing the user information, the access information bits being stored on the information carrier in a variation of a parameter, which variation is detectable by integration detection. The invention further relates to an apparatus for reading out information from the information carrier.

The art of hiding access information on an information carrier for holding user information is laid in the fact that you distract peoples' (the hackers) attention from the access information that you want to hide. Using this access information, the user information on the information carrier can be accessed. For copy protection purposes it is sometimes desired to hide this access, for example in the user information you want to protect or to hide this access information in a side channel present on the information carrier. From optical information carriers such as CD or DVD, it is for example known that this access information can be written in the so-called "wobble channel" (sometimes also called "radial error channel"). It is known that the access information can be stored using spread spectrum techniques in a secure way on an information carrier in a variation of a parameter, which variation is detectable by integration access information is stored in the radial excursion of the wobbled pre-groove. The amplitude of this excursion is small, typically some 5-10 nm peak to peak. In this way the wobble signal obtained by reading out this channel is very noisy and impossible to copy directly. In spread spectrum techniques, the hidden access information can be detected by integrating the read out signal in a special way. Spread spectrum techniques are for example known from "Digital Modulation and Coding", Wilson, p. 247-256 and the references therein. Integration detection is for example known from "Digital Baseband Transmission and Recording", Jan W. M. Bergmans, p. 122-129. In spread spectrum techniques the bandwidth of a signal is intentionally made larger using spread spectrum modulation. The modulated signal can be detected using integration detecting methods using for example a hypothetical maximum-likelihood receiver.

It is an object of the invention to realize an information carrier comprising access information on which illegal retrieval of the user information is further prevented.

According to the invention, this object is achieved by the information carrier which is characterized in that the access information bits are scrambled according to a pre-determined scrambling method. By scrambling the access information bits according to a pre-determined scrambling method detection of the access information is not possible as long as the scrambling method is not known. Using the integration detection technique, the only way to obtain the access information is by knowing how the signal obtained after reading-out the area comprising the access information bits must be processed.

In another embodiment of the information carrier according to the invention, the access information bits are scrambled by storing certain pre-determined access information bits inverted on the information carrier. In another embodiment of the information carrier according to the invention, the access information bits are scrambled by changing the sequence of the bits in a pre-determined quasi-random way. In these embodiments, the signal obtained by reading-out the area comprising the access information bits must first be amended according to the scrambling method used before the integrating detection technique will result in the access information technique.

In another embodiment of the system according to the invention, wherein the information carrier further comprises a wobbled pre-groove, the information carrier is characterized in that the access information bits are stored in the variation of the radial excursion of the wobbled pre-groove.

In another embodiment of the information carrier according to the invention, the scrambling method is hidden on the information carrier. In another embodiment of the information carrier according to the invention, the scrambling method is hidden in the radial excursion of the wobbled pre-groove. It is preferred that the scrambling method is kept as secret as possible. By hiding the scrambling method on the information carrier it can be prevented to disclose the scrambling method to the semiconductor companies that make IC's to be used in an apparatus for playing the information carrier according to the invention. Information on the scrambling method used can than for example be supplied to them by a piece of VERILOG code, with a well defined interface, which can be added to their own IC design and takes care of the detection of scrambling method used. This has as a further advantage that the position of the access information does not have to be mentioned in the standard specification describing the information carrier according to the invention.

It is preferred to be able to change the scrambling method used if one method becomes hacked. To this end, in another embodiment, the information carrier comprises a special area comprising scrambling method bits indicating the pre-determined scrambling method according to which the access information bits are scrambled. Preferably, the scrambling method bits are stored on the information carrier in a variation of a parameter, which variation is detectable by integration detection. Preferably, the special area comprises 8 scrambling method bits.

The scrambling method bits can be used for indicating different scrambling methods. For example 8 scrambling method bits can indicate 256 ($2^8$) possible bit sequences, each of these sequences representing a scrambling method. If the pre-determined scrambling method gets hacked, one can change the scrambling method used for future information carriers to one of the other methods. These scrambling method bits can for example be stored on the information carrier in a variation of a parameter, which variation is detectable by integration detection, so that these bits can be detected using integrating detection. This has the advantage that the bits are not easily detectable by hackers.

In another embodiment, the information carrier comprises a Permanent Information & Control data (PIC) zone, the access information being stored in the PIC zone. The access information can for example be information stored in the PIC zone in pre-recorded pits/lands (or marks/lands), but this information can also be stored in pre-recorded high frequency modulated (HFM) grooves which are modulated in the radial direction with a rather high bandwidth signal. This PIC zone is used in a new optical information carrier, called BluRay disc.

The invention further relates to an apparatus for reading out information from the information carrier according to the invention. The apparatus comprises a reading unit for reading out user information and access information from the information carrier, and access control means for descrambling the access information bits scrambled according to the pr-determined scrambling method and for providing access to the user information in dependence on the descrambled access information. In an embodiment, the access control means are integrated into a VERILOG block. In another embodiment, the apparatus further comprises a look up table comprising a list of pre-determined scrambling methods. Using this table, the scrambling method used can be replaced with a different scrambling method if the scrambling method is hacked.

These and other aspects of the invention are apparent from and will be elucidated with reference to the embodiments described hereinafter.

It is necessary to keep some parts of the copy protection scheme secret, not only the encryption keys, but also some signal processing or modulation method to store the keys or ID numbers. It is then necessary to supply a "black box" as a formatter to a mastering facility, and to supply a VERILOG description to the IC developers of decoders. So, there is (or are) a secret in the decoder part, or in a side channel, that requires special hardware to detect. In such a case, hackers cannot succeed by only modifying the application software or the drive firmware. Opposite to this need for secrecy, we have the necessity to test media in manufacturing. One way is to use scrambling at one or more phases in the signal-processing path, and to switch of the scrambling in some designated test area. In the unscrambled area, a "test key" can be read to test the margin for recovering the secret information, we need to measure some digital signal (e.g. bit error rate) or some analogue signal (e.g. Jitter or Signal to Noise Ratio). The test key may be some non-confidential disc info.

For BD-ROM, the copy protection system will contain a wobbled pit structure that contains the access information, e.g. in the form of an encryption key. The modulation in the wobble represents the bits of the key. The bits are scrambled with a secret scrambling method. As long as the scrambling method is not known one cannot detect the bits forming the encryption key. One would like to be able to keep the scrambling method as secret as possible. And even have back-up scenario's to possibly change the scrambling method if one method becomes hacked. These back ups need to be as simple as possible. On the information carrier according to an embodiment the scrambling method is written in an (unscrambled) part of the wobble key.

Figure 1:
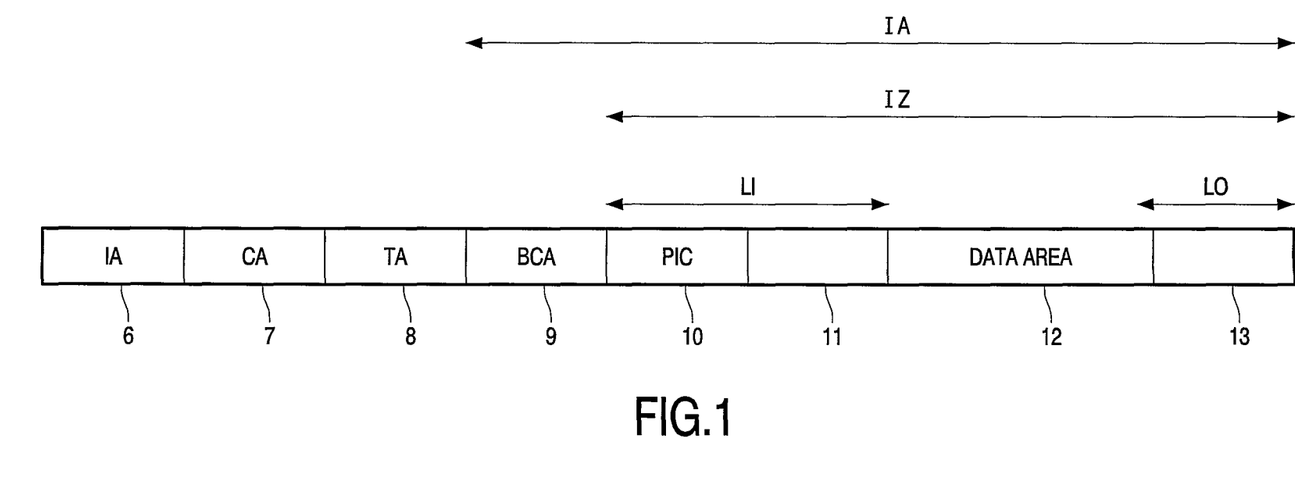
FIG. 1 shows a first embodiment of the information carrier according to the invention.

In the embodiment of the information carrier as shown in FIG. 1, the access information is stored in the PIC zone of the information carrier. In this embodiment, the information carrier comprises a so-called Permanent Information & Control data (PIC) zone. In this PIC zone general information about the information carrier and various other information in stored. In this way, a data channel for pre-recorded information with sufficient capacity and data rate is created. In this embodiment, the PIC information is stored in pre-recorded pits/lands (or marks/lands), but this information can also be stored in pre-recorded high frequency modulated (HFM) grooves which are modulated in the radial direction with a rather high bandwidth signal. Due to the fact that the information is stored in a wobble channel, a buried channel is created. In FIG. 1 the layout of the information carrier comprising the PIC zone is indicated. The area on the information carrier nearest to the carrier center is called the Inner area (IA) 6. Next to this is the Clamping area (CA) 7 which is used by the playing apparatus for clamping the information carrier so that a stable rotation can be accomplished. Next to this is the Transition area (TA) 8. After this area, the Information area (IA) is situated. This Information area comprises the Information Zone (IZ) and the Burst Cutting Area (BCA) 9. The Burst Cutting Area is used to add information to the information carrier after completion of the manufacturing process. The BCA-code can be written by a high-power laser system or by the initializer in case of rewritable discs. The Information Zone (IZ) comprises the Lead-in Zone (LI), the Data Area 12 and the Lead-out Zone (LO) 13. The Lead-in Zone comprises the PIC zone 10 and the rest of the Lead-in Zone 11. In this embodiment, the access information is stored in a pre-determined region of the PIC zone.

In order to be able to read out the access information, a reference to the position of the access information in the PIC zone can be retrieved by a certain method. In this embodiment this method is as follows. The PIC zone comprises a main data channel, with Address Unit Numbers (AUN). These AUN are used for indicating the starting position of the access information in the PIC zone. This is possible as the wobble channel signal is locked to the data signal (HF-channel). An address is 4 bytes (without ECC bytes). As the PIC zone is only situated in a small part of the information carrier, only a limited number of the least significant bits (lsb's) of the 32 bits change within the PIC zone (generally only the first 16 lsb's). These 16 bits are sufficient to determine the position within the PIC zone. The PIC zone extends over some 2000 tracks; suppose that the access information is only present in 20 consecutive tracks, the starting position of this access information being determined by an AUN from the user information. The first 16 lsb's of this AUN are than positioned over the complete PIC zone, for example using an unscrambled modulation. Due to that, it becomes possible, when you arrive at a random position in the PIC zone, to read out the first 16 bits of the AUN, to jump to the starting position of the access information, and to read out the access information. In this way, the exact location of the access information is further hidden in the PIC zone, as it is only situated in a certain position in this band, and not throughout the complete band.

In this embodiment, the access information is written in the PIC zone of the BD-ROM disc using a wobbled pit structure. The main data contained in the pit structure consists of the usual PIC information (Drive revocation information, Disc information). The access information can be part of a key needed to decrypt the user information on the disc. The amplitude of the wobble is small, say 5-10 nm peak to peak. In this way the wobble signal is very noisy and impossible to copy directly.

For CE drives even a large amplitude wobble is impossible to copy since the drive cannot wobble the actuator. So the use of a wobble in the information carrier to contain the key makes bit by bit copying of content impossible for the CE drive (under the assumption that in future advanced CE drives will become available that can wobble the actuator one cannot prevent the actual copying of the wobble). But if one chooses the period of the CPS wobble in BD-ROM 69T the copied CPS wobble on the BD-RE disc will interfere with the pregroove on this disc which has the same frequency of 69 channel bits. Therefore read out of the CPS wobble on the copied disc is impossible, this is also mentioned in Philips patent U.S. Pat. No. 5,724,327 for the CD case. Professional pirates however who have access to mastering equipment might use this large wobble amplitude to drive a deflector signal for mastering the wobble on a next illegally made stamper. Therefore the wobble amplitude should be small enough so that this method becomes impossible as well for these pirates. The wobble signal is than too noisy to correctly drive a deflector in the mastering equipment to copy the wobble. Detection of the data in this wobble is only possible by integration detection. Of course hackers might still use this method to get the data out of the wobble. But another method is used to prevent this: scrambling. This embodiment is explained with reference to FIG. 2.

Scrambling of data can be done in several ways. One possibility is inverting the bits of the key in a predefined secret way. Another is by permutating the sequence of bits in a predefined way which varies during the integration. Thirdly one could use a mixture of both methods. As long as the scrambling method is not known one cannot integrate the signal. To properly integrate the signal one needs to make a unipolar signal out of the bipolar signal by applying the inverse of the secret scrambling method on the detected bits. Only then can the soft decision information become lifted out of the noise.

Figure 2:
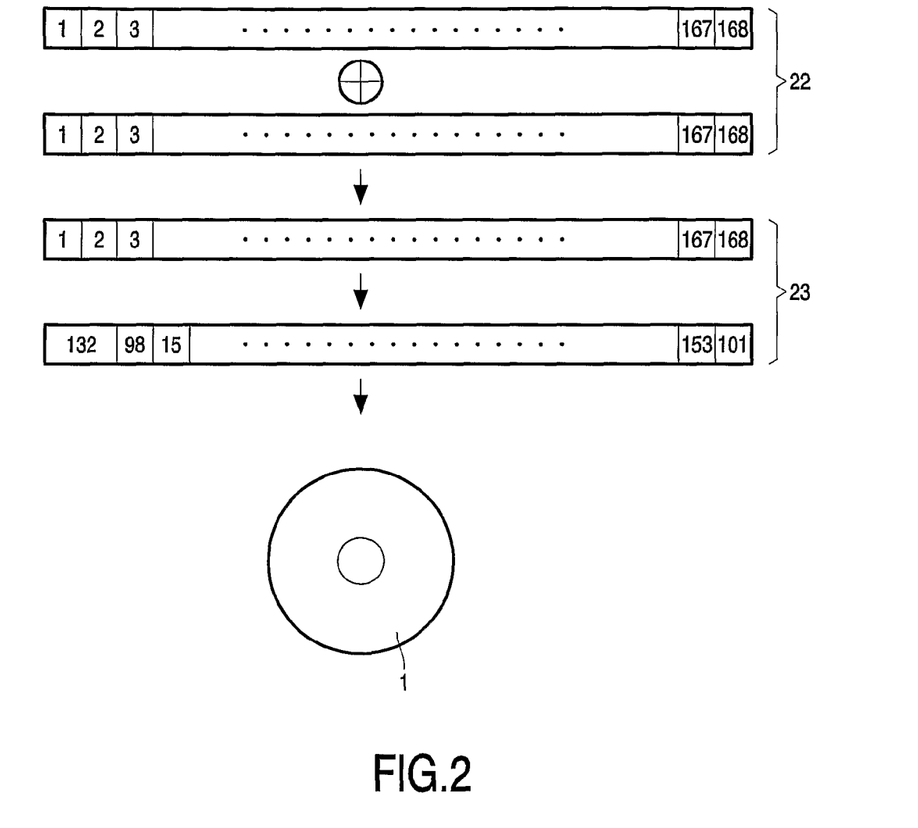
FIG. 2 shows a second embodiment of the information carrier according to the invention.

In the embodiment of FIG. 2, in step 22, 168 bits comprising the access information, CRC bits and spare bits are XOR-ed with 168 random bits. These random bits can for example be retrieved from the information carrier or can be present in the apparatus reading out the information carrier. On the resulting bits a random permutation is performed in step 23. This permutated bits are than written on the information carrier 1. These bits can be written in a key frame as will be explained in FIG. 3. The random bits and the random permutation used can be changed for every key frame. The permutation can be repeated every ECC block; the scrambling seed can for example be derived from the AUNs., the address numbers used in the PIC zone.

Figure 3:
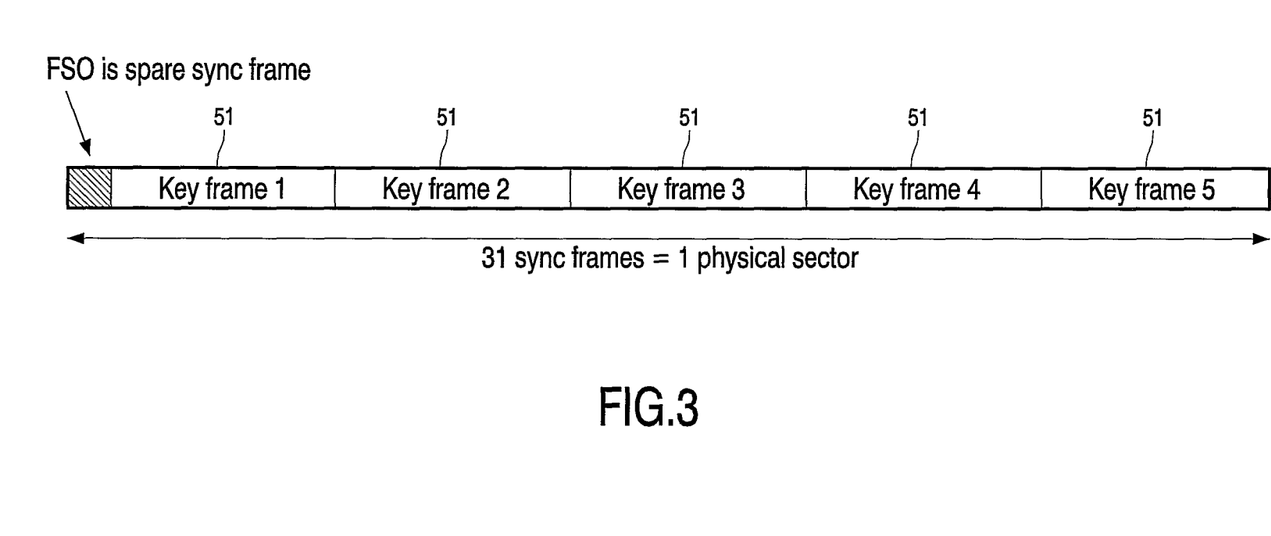
FIG. 3 shows another embodiment of the information carrier according to the invention.

FIG. 3 shows another embodiment of the information carrier. In this embodiment the 168 bits comprising the scrambled access information bits are stored in the wobble channel present in the Key frames 51. In this embodiment five Key frames plus a spare sync frame make up 1 physical sector. The five Key frames itself form one Address Unit (80 Key frames and thus 16 Address Unit are present in each ECC cluster). Only with knowledge of the secret permutation used on the access information store in the wobble channel proper integration of the bits can be performed. In an embodiment, this secret permutation stays in the VERILOG block (also called LSI package). This has the advantage that the position of the access information does not have to be mentioned in the standard specification describing this information carrier. This embodiment can be used when no backup option for changing the scrambling method used is required.

Figure 4:
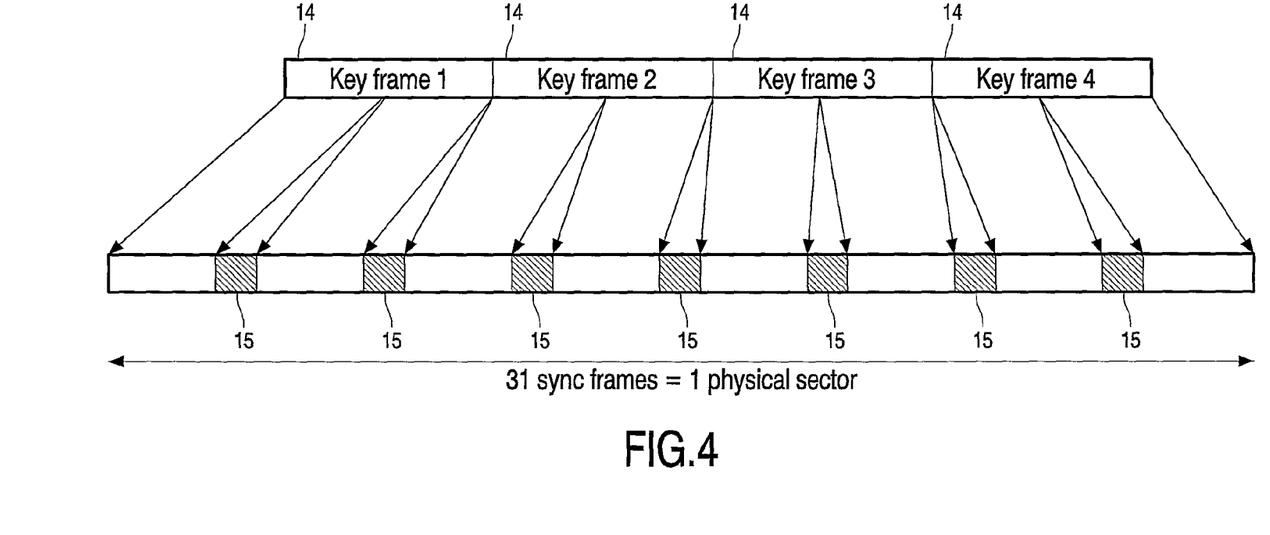
FIG. 4 shows another embodiment of the information carrier according to the invention.

One would like to be able to keep the scrambling method as secret as possible. And even have back-up scenario's to possibly change the scrambling method if one method becomes hacked. These back ups need to be as simple as possible. Another embodiment of the information carrier according to the invention which enabled changing the scrambling method is shown in FIG. 4. In this embodiment the information carrier comprises four Key frames 14. In these Key frames, 31 sync frames are present, being numbered from 0 to 30. In sync frames number 3, 7, 11, 15, 19, 23 and 27 (indicated with reference number 15) an 8-bit number is stored which indicates the exact location of the access information. In the case the access information is stored on the information carrier in a variation of a parameter, which variation is detectable by integration detection, the exact location of the access information can be changed using this 8 bit number. This 8-bit number can than for example indicate which seed and permutation should be used for detecting the bits making up the access information.

It is also possible to write in a specific area in the wobble in the PIC zone, in an unscrambled manner, a sequence of bits, e.g. 8. These 8 bits can be integrated out of the noise using integration detection very easily since scrambling is absent (one could alternatively use scrambling, but then it should be a fixed method known by the drive). The sequence of bits gives $2^8=256$ possible bit sequences. Each of these sequences then represents a secret scrambling method. A look up table which contains a list of these 256 methods can be contained in the drive in the secret wobble key detection circuit. This sequence can be read easily, then the scrambling method is known and then the wobble key can be detected. If the scrambling method gets hacked one simply changes for future discs to one of the other 256 methods. Of course, the wobble detection circuit in the drive must know all the 256 scrambling methods. Typically the wobble detection circuit is put in VERILOG code and this is given to the circuit manufacturer. In this way one has to hack the VERILOG code to find out what the 256 scrambling methods are. This is complicated and not everyone has access to this VERILOG code. Another location where the scrambling method needs to be known is in the mastering equipment. But in this case only the currently installed scrambling method needs to be implemented and not all the 256 scrambling methods. If one scrambling method is hacked the specific wobble encoder in the format generator of the mastering equipment can be replaced with another one with a different scrambling method. (from the 256 possible methods.) This limits the access to this secret information considerably.

Figure 5:
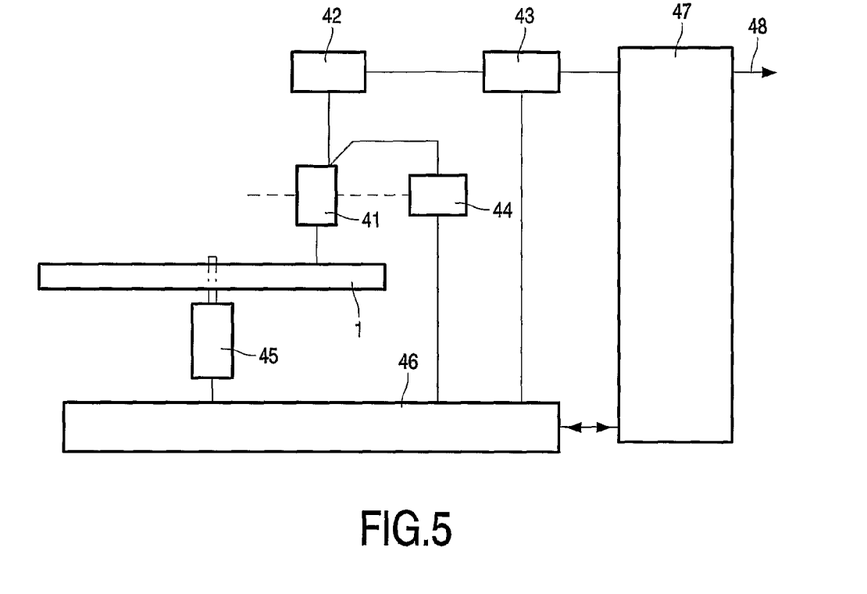
FIG. 5 shows an embodiment of an apparatus for reading out access information from an information carrier.

FIG. 5 shows an embodiment of an apparatus for reading out access information from an information carrier. The apparatus comprises a reading unit for reading out user information and access information from the record carrier 1. The read unit comprises a read head 41 for scanning the track and generating a read signal corresponding to the physical marks on the record carrier, and a translating unit 42 for translating the read signal into the bit sequence, e.g. an EFM decoder for decoding in a CD system. The bit sequence is coupled to an error-correcting unit 43 for recovering the information and correcting possible errors, e.g. the CIRC corrector in a CD system. The recovered information is coupled to access control means 47 for controlling the access to the information. The read out access information is available for further processing on the output 48 of the access control means 47. During reading the read head 41 is positioned on the track by a servo unit 44 of the usual type, while the record carrier is rotated by a motor unit 45. The reading of information is controlled via a controller 46, which controller controls the motor unit 45, the servo unit 44 and the error correction unit 43, and is arranged for receiving read commands, e.g. via an interface to the access control means 47.

The reading out of the access information will be effected as follows. The access control means will read out scrambled access information bits from the PIC zone. Using integration detection techniques and the (de-)scrambling method used on these bits, the access control means are able to retrieve the access information. Using this access information, which can for example be a decryption key for decrypting the encrypted user information, access is giving to the user information. In the case the information carrier does not comprise the access information, or the apparatus is not capable of reading out the access information, the information carrier will be rejected and access to the user information will be barred.

Figure 6:
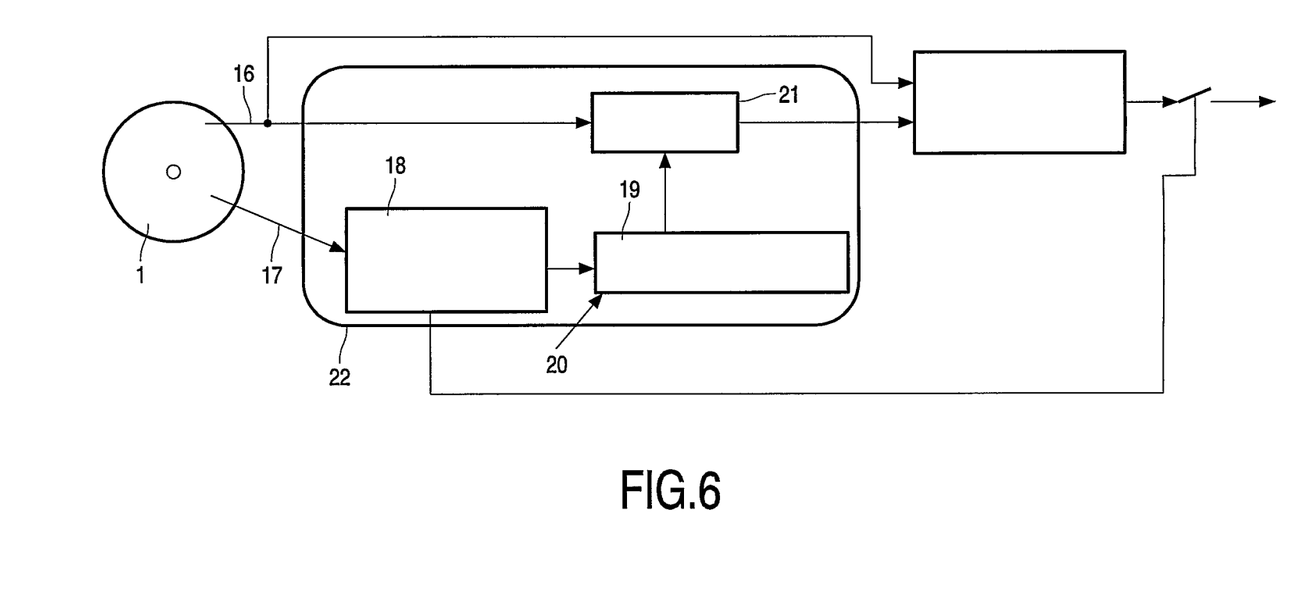
FIG. 6 shows an embodiment of the use of the access information for giving access to the user information.

FIG. 6 shows an embodiment of the use of the access information for giving access to the user information. It is shown that user information 16 is read out from the information carrier 1, for example using the apparatus as shown in FIG. 4. The access information 17 is detected in a detection module 18. The detection module has knowledge on the scrambling method used for scrambling the access information bits. The scrambled access information bits are first detected using integration detection and than descrambled. Using this detected access information the decryption key is calculated in module 19. As an extra input for the (de)scrambling method, a random number 20 can be used. This number can be the random number used for permutating the bits as described with reference to FIG. 2. This number can be a number hidden on the information carrier, but can also be inputted by the user of the apparatus. The calculated key is used in decryption module 21 to decrypt the user information. After decryption of the user information this information is further processed or outputted. This can be made conditional on the detection of the correct access information. Modules 18, 19 and 21 can be supplied to the IC manufacturers in VERILOG code. Due to this, no information on the access information detection or the key calculation have to be disclosed, as this takes places inside the VERILOG block 22.

Figure 7:
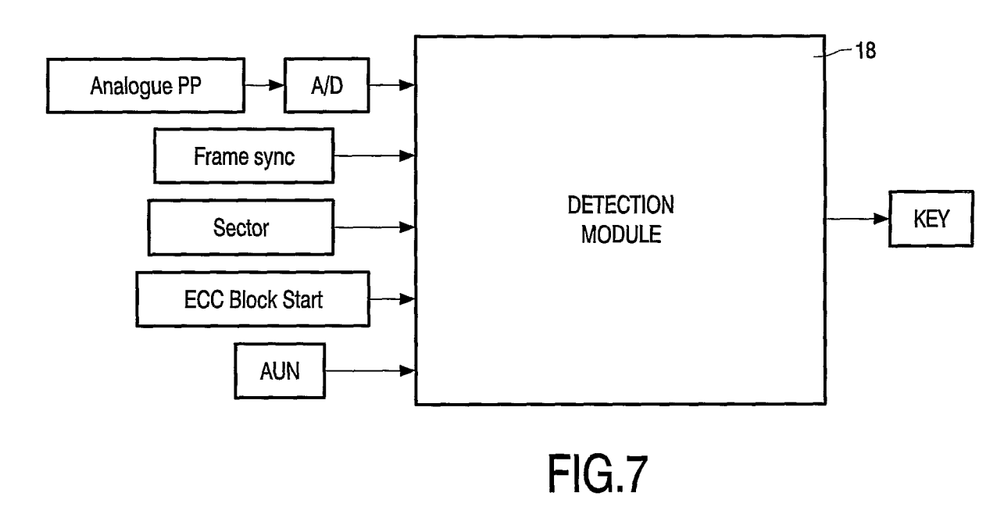
FIG. 7 shows an embodiment of the detection module used in the apparatus.

FIG. 7 shows an embodiment of the detection module used in the apparatus. In this embodiment the detection module 18 is supplied as a VERILOG code. Frame sync and Sector start are inputted to this detection module as these are needed to find the wobble key bit locations comprising the access information bits. ECC Block Start is inputted as this is needed for knowledge on the permutation sequence of the scrambled access information bits. AUN is inputted as this is needed in the seed generation in the scrambling method. All signals are supplied synchronous with the frame sync in the user information, inputted in the detection module after A/D conversion. After descrambling the access information bits, the detection module outputs the access information, for example as a key for decrypting the user information.

Although the invention has been elucidated with reference to the embodiments described above, it will be evident that other embodiments may be alternatively used to achieve the same object. The scope of the invention is therefore not limited to the embodiments described above, but can also be applied to all kinds of information carriers, read-only, write-once or rewritable types of carriers. The scope of the invention is further not limited to certain kinds of access information. All information which is or can be used as access information, i.e. information used for giving access to the user information stored or to be stored on the information carrier according to the invention fall within the scope of the invention. The scope of the invention is further not limited to certain buried channel techniques or certain (hidden) side channels. All techniques and channels which can be used for storing information fall within the scope of the invention. Further, the invention is not limited to spread spectrum techniques in which the access information is stored in a small radial excursion of the wobbled pre-groove. All physical parameters can be used for introducing a small change in a detectable property to store integration detectable information on an information carrier.

It must further be noted that the term "comprises/comprising" when used in this specification, including the claims, is taken to specify the presence of stated features, integers, steps or components, but does not exclude the presence or addition of one or more other features, integers, steps, components or groups thereof. It must also be noted that the word "a" or "an" preceding an element in a claim does not exclude the presence of a plurality of such elements. Moreover, any reference signs do not limit the scope of the claims; the invention can be implemented by means of both hardware and software, and several "means" may be represented by the same item of hardware. Furthermore, the invention resides in each and every novel feature or combination of features.

The invention can be summarized as follows. The invention relates to an information carrier for holding user information, the information carrier comprising access information in the form of access information bits for accessing the user information, the access information bits being stored on the information carrier in a variation of a parameter, which variation is detectable by integration detection. The access information bits are scrambled according to a pre-determined scrambling method. By scrambling the access information bits according to a pre-determined scrambling method detection of the access information is not possible as long as the scrambling method is not known. Using the integration detection technique, the only way to obtain the access information is by knowing how the signal obtained after reading-out the area comprising the access information bits must be processed. In this way illegal retrieval of the user information is further prevented.

The invention claimed is:

1. A system for playback of at least one information carrier holding user information, the system comprising:
   a non-transitory information carrier for storing a plurality of scrambled access information bits that enable access to the user information, the access information bits comprise at least one physical parameter related to the information carrier, wherein the physical parameter stores integration detectable information on the information carrier, wherein the access information bits are scrambled according to one or more pre-determined scrambling methods, and the access information bits are stored in a variation of the at least one physical parameter, the variation is based on a spread spectrum technique, so as to be detectable only by integration detection, the one or more pre-determined scrambling methods including a permutation of the access information bits, wherein the information carrier stores an indicator for indicating the selected scrambling method; and
   a processor for performing integration detection to detect the variation of the at least one physical parameter stored on the information carrier.

2. The system as claimed in claim 1, wherein the access information bits are scrambled by storing certain pre-determined access information bits inverted on the information carrier and unscrambled by an access control device to produce the output signal.

3. The system as claimed in claim 1, wherein the access information bits are scrambled by changing the sequence of the bits in a pre-determined quasi-random way.

4. The system as claimed in claim 1, wherein the information carrier comprises a wobbled pre-groove and the access information bits are stored in a variation of the radial excursion of a wobbled pre-groove.

5. The system as claimed in claim 4, wherein the one or ire pre-determined scrambling methods are hidden on the information carrier.

6. The system as claimed in claim 5, wherein the one or more pre-determined scrambling methods are hidden in the radial excursion of the wobbled pre-groove.

7. The system as claimed in claim 5, wherein the information carrier further includes a special area comprising scrambling method bits for identifying the selected pre-determined scrambling method.

8. The system as claimed in claim 7, wherein the indicator for indicating that the selected scrambling method is stored on the information carrier in a variation of the at least one parameter, which variation is detectable by a detection module performing integration detection.

9. The system as claimed in claim 7, wherein the special area comprises eight (8) scrambling method bits indicating which of the one or more pre-determined scrambling methods is selected.

10. The system as claimed in claim 1, the information carrier further includes a Permanent Information & Control data (PIC) zone having a plurality of PIC portions, the access information bits being stored in the PIC zone in he plurality of PIC portions.

11. The system as claimed in claim 10, wherein the access information bits are stored in the PIC zone in pre-recorded pits-lands or in pre-recorded high frequency modulated grooves.

12. The system as claimed in claim 1, wherein the access information bits are stored in a variation of the at least one physical parameter in keyframes.

13. The system as claimed in claim 12, wherein the permutation is different for every key frame.

14. An apparatus for reading out an information carrier including user and access information, the apparatus comprising:
a reader configured to read out from the information carrier scrambled access information bits identifying a location of the user information on the information carrier; and
a descrambler configured to descramble the scrambled access information bits scrambled according to one or more pre-determine scrambling methods before being stored on the information carrier, the descrambled access information bits providing access to the user information, the descrambled access information bits comprise at least one physical parameter related to the information carrier, wherein the physical parameter stores integration detectable information on the information carrier, wherein the descrambled access information bits are stored in a variation of the at least one physical parameter, the variation is based on a spread spectrum technique, so as to be detectable only by integration detection, the one or more pre-determined scrambling methods including a permutation of the descrambled access information bits, wherein information carrier stores an indicator for indicating the one or more pre-determined scrambling methods.

15. The apparatus as claimed in claim 14, wherein the descrambler is integrated into a logical block of the information carrier that includes the one or more pre-determined scrambling methods.

16. The apparatus as claimed in claim 14, further comprising a look up table comprising a plurality of pre-determined scrambling methods, wherein the descrambler utilizes a plurality of scrambling method bits identifying the selected one of the one or more predetermined scrambling methods.

17. The apparatus as claimed in claim 14, wherein the access information bits are stored in a variation of the at least one physical parameter in keyframes.

18. The apparatus as claimed in claim 17, wherein the permutation is different for every key frame.

19. A method for playback of at least one information carrier holding user information, the method performed by an access control device comprising acts of:
reading a plurality of scrambled access information bits that enable access to the user information, the access information bits comprise at least one physical parameter related to a non-transitory information carrier, wherein the at least one physical parameter stores integration detectable information on the information carrier, wherein the access information bits are scrambled according to one or more pre-determined scrambling methods, and the access information bits are stored in a variation of the at least one physical parameter, the variation is based on a spread spectrum technique, so as to be detectable only by integration detection, the one or more pre-determined scrambling methods including a permutation of the access information bits, wherein the information carrier stores an indicator for indicating the one or more pre-determined scrambling methods;
performing integration detection to detect the variation of the at least one physical parameter stored on the information carrier;
descrambling the scrambled access information bits using the detected variation and the one or more pre-determined scrambling methods;
reading out the user information using the descrambled access information bits.

20. The method as claimed in claim 19, wherein the act of descrambling the scrambled access information bits uses a permutation that is different for every key frame.

* * * * *